United States Patent Office 3,531,308
Patented Sept. 29, 1970

3,531,308
TRANSPARENT SPINEL BODY
Rodney D. Bagley, Corning, N.Y., assignor to Corning Glass Works, Corning, N.Y., a corporation of New York
No Drawing. Filed Oct. 9, 1967, Ser. No. 674,001
Int. Cl. C04b 35/44
U.S. Cl. 106—62                                   10 Claims

ABSTRACT OF THE DISCLOSURE

Polycrystalline magnesium aluminate spinel bodies of improved transmittance of visible light and of infrared radiation are formed by sintering, in either a vacuum or a hydrogen atmosphere, a preformed green body of an intimate mixture of the spinel and a small but effective amount of magnesium oxide. Sintering is carried out at from about 1500° C., to about 1900° C., the preferred temperature range being from about 1550° C. to about 1850° C. Optimum results are obtained when the mol ratio of magnesium oxide to the spinel does not exceed about 0.04:1 although from less than about 0.04 up to about 0.35 mol of the oxide per mol of spinel may be employed.

BACKGROUND OF THE INVENTION

Field of the invention

The present invention relates to magnesium aluminate spinel bodies modified by the inclusion of a small amount of excess magnesium oxide and characterized by enhanced transmittance of visible light and of infrared radiation relative to the spinel itself, high density, high strength and thermal stability at elevated temperatures.

The materials are particularly useful in the manufacture of transparent envelopes for high temperature light sources and as infrared radiation transmitting bodies.

Description of the prior art

U.S. Pats. 3,026,210, Coble, and 3,083,123, Navias, are considered illustrative of the prior art.

Coble enhances the transmittance of alumina bodies by sintering a mixture of finely divided alumina containing a small amount, up to 0.5 weight percent of the mixture, of finely divided magnesia. Spinel is formed in situ. As pointed out in the paragraph beginning on line 55, column 3 of Coble and in the paragraph immediately following, a magnesia content in excess of this small amount leads to formation of an amount of second phase spinel sufficient to reduce transparency. Furthermore, as indicated in the paragraph beginning at line 22, column 4, the presence of magnesia is required only during the sintering step; it need not be retained in the sintered alumina body but may be largely or completely fired out of the body without impairment of the light-transmission characteristics of the alumina body.

Navias produces magnesium aluminate spinel bodies by exposing an alumina body to magnesia vapor at a temperature between 1500° C. and 1900° C. in a hydrogen atmosphere. The magnesia vapor and hydrogen move through space relative to the alumina body. Depending on conditions of time and temperature, the diffusion of the magnesia into the alumina and reaction therewith may either be complete, so that a homogeneous spinel body results, or partial, in which case the alumina body is provided with an outer zone of spinel composition.

Neither reference provides the magnesium aluminate spinel-magnesium oxide bodies of the present invention which display superior transmittance relative to the spinel itself.

SUMMARY OF THE INVENTION

According to the present invention, it has been found that a pulverulent intimate mixture of magnesium aluminate spinel and magnesium oxide can be sintered to give a transparent polycrystalline body exhibiting, when compared to a sintered polycrystalline body of stoichiometric magnesium aluminate spinel itself, enhanced transmittance of visible light and of infrared radiation.

Maximum transmittance is obtained when no more than about 0.04 mol of excess magnesium oxide per mol of the spinel is present in the composition. However, the invention contemplates the employment of from a small but effective amount up to about 0.35 mol of magnesium oxide per mol of magnesium aluminate spinel.

Depending on the composition of the pulverulent mixture, sintering may be carried out at a temperature of from about 1500° C. to about 1900° C., mixtures of higher magnesium oxide content requiring the higher sintering temperatures. Sintering is preferably carried out in a hydrogen atmosphere, but, if desired, it may be effected in a vacuum.

Complete uniformity of the sinterable mixtures being obviously desirable, the invention further is concerned with the preparation of the spinel-magnesium oxide mixtures. These may advantageously be obtained by dissolving in water aluminum ammonium alum and a magnesium salt thermally decomposable to magnesium oxide, such as magnesium nitrate, evaporating the water from the solution and calcining the residue of mixed salts in air at a temperature of from about 1100° C. to about 1300° C. to obtain a friable powder with a particle size of less than about one micron.

DESCRIPTION OF THE PREFERRED EMBODIMENTS

The preferred method for carrying out the invention comprises providing an intimate mixture of magnesium oxide and magnesium aluminate spinel, both of which are of high purity and of small particle size, forming bodies of desired shape by dry pressing the mixture and sintering the thus formed green bodies in vacuum or in a hydrogen atmosphere at a temperature within the range of 1500° C. to 1900° C.

The mixture of magnesium oxide and spinel is prepared by calcining, at a temperature of from about 1100° C. to about 1300° C., an intimate mixture of aluminum oxide and magnesium oxide, the latter being present in an amount of from slightly more than 1 to about 1.35 mol per mol of alumina. Since alumina and magnesium oxide react stoichiometrically in the formation of spinel, the calcined mixture contains from a small but effective excess amount to about 0.35 mol of magnesium oxide per mol of the spinel.

In order to obtain the two phase magnesium oxide-spinel mixture in as uniform a condition as possible, as well as to obtain the components of the mixture as desired small particles, the invention contemplates the formation of magnesium oxide and alumina from a single phase source of both of these materials. Thus, ammonium aluminum sulfate dodecahydrate (M.P. 93.5° C.) and magnesum nitrate hexahydrate (M.P. 89° C.) may be readily melted together, in desired proportion, to give a totally homogeneous solution, the solvent being the water of hydration of each compound. This solution is heated to drive off the water of hydration with the result that an essentially homogeneous mixture of the salts is obtained. This mixture is gradually heated to a temperature within the range of from about 1100° C. to about 1300° C. and calcined at that temperature for from 1 to 10 hours, depending on the rate at which the mixture is raised to calcining temperature, the composition of the mixture, the rate of flow of air through the furnace and the like. Presumably, both magnesium oxide and alumina are formed and, at the calcining temperature, react to form the spinel. Excess magnesium oxide present in uniformly dispersed throughout the spinel. The calcine mass is extremely friable and is readily reduced to a sinterable powder with a particle size of less than about one micron.

Ammonium aluminum sulfate dodecahydrate and magnesium nitrate hexahydrate are the particularly preferred thermally decomposable sources of alumina and magnesia. However, as will be evident to the skilled worker, other sources, such as hydrates of aluminum sulfate, magnesium acetate, magnesium chloride and the like, may be substituted therefor.

It is not, of course, necessary to employ hydrated salts since fused mixtures of the anhydrous salts represent totally homogeneous solutions of the one salt in the other. However, the low melting points of the hydrated salts, such as ammonium aluminum sulfate dodecahydrate and magnesium nitrate hexahydrate, facilitate the preparation of the fused mixture.

Other methods of obtaining intimate, uniform mixtures of magnesium aluminate spinel and magnesium oxide are available. For example, in the above described method the thermally decomposable salt sources of alumina and magnesia can be employed on a stoichiometric basis so that the friable, sinterable powder obtained is the spinel essentially free of excess magnesia. This may be thoroughly mixed with a solution of a salt source of magnesia, for example magnesium nitrate, in water or in methanol. The resulting wet material is then dried while mixing is continued. A uniform blend of spinel and the source of magnesia is obtained. Thermal decomposition of the source of magnesia in this blended material yields magnesium aluminate spinel containing excess magnesia uniformly distributed throughout its mass. The amount of magnesia is, of course, dependent on the amount of magnesia source originally mixed with the stoichiometric magnesium alumi nate spinel.

It is apparent that the alumina and the magnesia, which ultimately enter into reaction to form the spinel and the excess magnesia combined with the spinel in the sintered products of the invention, should be of high purity so as to minimize the possibility of forming isolated occlusions of impurities in the sintered products, with consequent decrease of the in-line transmittance because of the increased degree of scattering of radiation in the products. Accordingly, the thermally decomposable salt sources of magnesia and of alumina should be of the highest possible purity.

In preparing green bodies of the magnesium oxide-spinel composition, as by dry pressing or isostatic molding, it is generally unnecessary to employ a binder. If desired, a small amount of distilled water, up to about 10% of the weight of the composition, may be incorporated therein. Of course, other binders will suggest themselves to the skilled worker wishing to employ a binder.

Desirably, green bodies or compacts of the compositions described should exhibit a green density of at least 35% of theoretical. To accomplish this, forming pressures of about 20,000 p.s.i. are usually employed.

As indicated above, firing of the green bodies may be carried out either in a vacuum or in a hydrogen atmosphere. The hydrogen atmosphere is preferred inasmuch as its employment minimizes volatilization of magnesia. Of course, this loss can be further minimized in the hydrogen atmosphere additionally contains volatilized magnesia.

Green bodies or compacts of compositions having a relatively small magnesia content, for example 0.04 mol per mol of spinel or 1.04 mol per mol of alumina, densify to a non-porous state more rapidly than do those of compositions having a relatively high magnesia content. The more rapid densification of the former may result in the trapping in the pores of the sintered body of residual volatile impurities. In the more slowly densifying high magnesia content compositions, such evolved volatile impurities more readily escape from the still porous structure. Trapped impurities, of course, reduce the ability of the sintered body to transmit desired radiation. For this reason, it is generally beneficial, particularly in the case of compacts of compositions of low magnesia content, to maintain the compacts for a period of time at a temperature below that at which sintering takes place at a practical rate in order to effect substantially complete removal of such impurities. More specifically, the heating prior to sintering may be carried out at a temperature within the range of from about 1400° C. to about 1500° C. The period of time that the green body is held at this temperature will depend on several factors, particularly the purity of the composition being treated, and may be determined by the skilled workman by simple experiment. Generally, the hold time within the stated temperature range will not exceed about 8 hours and may, in the case of bodies of relatively high magnesia content, be omitted entirely.

This heating prior to sintering is preferably conducted in a hydrogen atmosphere, although it may also be carried out in a vacuum.

After being subjected to the described heat treatment, the green body may be cooled to ambient temperature and set aside for subsequent sintering. However, practically and economically, sintering will immediately follow the heat treatment.

Sintering of the green bodies to the products of the invention is carried out at a temperature within the range of about 1500° C. to about 1900° C. for a period of time of from about 20 minutes to about 7 or more hours. Bodies of compositions of relatively high magnesia content should be fired at the higher temperatures if maximum transmittance of infrared radiation is to be achieved. Alternatively, it should be observed that maximum transparency to infrared radiation may also be obtained by firing at the lower end of the temperature range if the duration of the firing is sufficiently increased. Those bodies containing only a small amount of excess magnesia, as, for example, less than about 0.1 mol per mol of spinel may be fired at either high or low temperature within the range specified; the transparency to infrared radiation is not significantly influenced by the temperature employed in firing.

To obtain the maximum transparency to radiation in the visible range in a practical period of time, it is desirable to fire all the compositions of the invention at a higher temperature, for example, 1850° C.

Following the above generally outlined procedure, a number of sintered bodies of various magnesium oxide-magnesium aluminate spinel compositions and of magnesium aluminate spinel itself were prepared, as specifically described in Example 1.

EXAMPLE 1

A mixture of one gram-mol each of magnesium nitrate hexahydrate and ammonium aluminum sulfate dodecahydrate, both Mallinkrodt Analytical Reagent grade materials, was fused in an alumina crucible in an electric furnace. Provision was made for moving air through the furnace to sweep out volatile material. The temperature was raised to 500° C. during about 3.5 hours and held at that temperature for about 3 hours. Thereafter, the temperature was gradually raised to 1300° C. during 5 hours and held at that temperature for about 1.5 hours. The material was then allowed to cool in the furnace to room temperature.

The resulting magnesium aluminate spinel was a fine white powder, substantially all of which exhibited a particle size of less than about one micron.

This procedure was repeated with mixtures of the ammonium aluminum sulfate dodecahydrate and increasing amounts of magnesium nitrate hexahydrate to give intimate mixtures of the spinel with increasing amounts of excess magnesium oxide.

Disk shaped compacts were prepared from these powders by dry pressing at 20,000 p.s.i. in a plunger type die having filter paper facings to reduce the possibility of contamination. These compacts were fired lying flat in a rectangular molybdenum boat covered with a molybdenum sheet which was covered with powdered magnesia. The layer of magnesia was covered with a second molybdenum sheet to prevent excessive volatilization of the magnesia into the furnace. The boat with its contained samples was placed in a cold furnace which was provided with a flow-through hydrogen atmosphere. The furnace temperature was raised to 1400° C. during 8 hours, then to 1500° C. during an ensuing period of about 16 hours. After the hold period between 1400° and 1500° C. the samples were raised, at the rate of 12° C./minute, to firing temperature, at which temperature they were maintained for a period of 7 hours. The furnace was then shut down and allowed to cool to room temperature.

The sintered disk-shaped bodies were rough ground, then polished with diamond paste to a thickness of 1 mm. The in-line transmittance of the samples was measured with a Perkin-Elmer Model 350 spectrophotometer. The results are set out in Table I, below.

TABLE I.—TRANSMITTANCE AT 0.5 MICRON WAVELENGTH, PERCENT

| | Firing conditions | |
|---|---|---|
| | 1,600° C., 7 hrs. | 1,850° C., 7 hrs. |
| Mols excess MgO per mol Spinel: | | |
| 0.0 | 3.9 | 7.0 |
| 0.04 | 17.9 | 42.8 |
| 0.12 | 5.2 | 28.3 |
| 0.22 | 3.9 | 21.0 |
| 0.35 | 3.4 | 13.2 |
| 0.46 | 2.0 | 8.0 |
| 0.67 | 1.0 | 4.6 |

TRANSMITTANCE AT 1.0 MICRON WAVELENGTH, PERCENT

| | Firing conditions | |
|---|---|---|
| | 1,600° C., 7 hrs. | 1,850° C., 7 hrs. |
| Mols excess MgO per mol Spinel: | | |
| 0.0 | 5.4 | 8.3 |
| 0.04 | 40.8 | 51.8 |
| 0.12 | 18.4 | 40.7 |
| 0.22 | 7.0 | 33.4 |
| 0.35 | 4.3 | 22.3 |
| 0.46 | 1.7 | 15.0 |
| 0.67 | 1.0 | 9.3 |

From the above it is immediately apparent that the inclusion of a minor amount of excess magnesia in a sintered magnesium aluminate spinel body is highly effective to increase the transparency of the body to radiation of the frequency range indicated and that the effect of such inclusion is markedly enhanced as the excess magnesia content is minimized. It is further to be noted that, as a practical upper limit, the magnesia should be present in an amount no greater than 0.35 mol per mol of the spinel.

The desirability of firing the described bodies at high temperature to insure maximum transmittance of visible radiation is also indicated by the data given.

EXAMPLE 2

The in-line peak transmittance of samples having a thickness of 1 mm. was determined using a Perkin-Elmer Model 221 spectrophotometer.

The results are set out in Table II.

TABLE II.—PEAK TRANSMITTANCE AT VARIOUS WAVELENGTHS, PERCENT

| | Firing conditions | |
|---|---|---|
| Mols excess MgO per mol Spinel | 1,600° C., 7 hrs. | 1,850° C., 7 hrs.. |
| 0.0 | 48.0 at 5.3 microns | 49.5 at 5.3 microns. |
| 0.04 | 74.5 at 4.7 microns | 76.0 at 4.5 microns. |
| 0.12 | 57.0 at 5.2 microns | 68.0 at 4.5 microns. |
| 0.22 | 49.0 at 5.3 microns | 64.0 at 4.5 microns. |
| 0.35 | 30.0 at 5.6 microns | 52.0 at 4.5 microns. |
| 0.46 | 12.5 at 5.9 microns | 43.5 at 4.5 microns. |
| 0.67 | 1.0 at 6.2 microns | 34.0 at 4.5 microns. |

The superiority of the products of the invention over stoichiometric magnesium aluminate spinel prepared in the same fashion as an infrared radiation transmitting material is demonstrated by the above data. The materials containing the least amount of excess magnesia each transmit 50% more of the indicated radiation in the infrared than do the stoichiometric spinel bodies.

It will be observed that, while the transmittance of the body containing 0.04 mol of excess magnesia and fired at 1600° C. is essentially equivalent to that of the same body fired at 1850° C., those bodies containing increasing amounts of magnesia benefit significantly from being fired at the higher temperature. The body containing 0.35 mol of excess magnesia and fired at 1850° C. is at least measurably superior to the comparable stoichiometric spinel body.

EXAMPLE 3

The in-line transmittance of radiation of several frequencies by magnesium aluminate spinel bodies containing various amounts of excess magnesia was compared to that of a comparable body of stoichiometric spinel itself. The samples were polished disks having a thickness of 1 mm. and were prepared from bodies sintered at 1850° C. for 7 hours in a hydrogen atmosphere. For radiation having a wave length up to 2.0 microns, the transmittance was measured by means of a Perkin-Elmer Model 450 Spectrophotometer. For radiation of longer wave lengths, a Perkin-Elmer Model 221 Spectrophotometer was employed. The results are summarized in Table 3.

TABLE III.—TRANSMITTANCE AT VARIOUS WAVELENGTHS, PERCENT

| Radiation | Wavelength, microns | Mol MgO per mol of spinel | | | | | | |
|---|---|---|---|---|---|---|---|---|
| | | 0.0 | 0.04 | 0.12 | 0.22 | 0.35 | 0.46 | 0.67 |
| Ultraviolet | 0.2 | 1 | 1 | 1 | 1 | 0 | 0 | 0 |
| Do | 0.24 | 3 | 7 | 3 | 2 | 1 | 1 | 1 |
| Do | 0.3 | 6 | 20 | 11 | 6 | 4 | 3 | 2 |
| Do | 0.4 | 8 | 34 | 21 | 13 | 8 | 6 | 3 |
| Visible | 0.4 | 7 | 35 | 21 | 15 | 9 | 6 | 3 |
| Do | 0.5 | 7 | 43 | 28 | 21 | 13 | 8 | 5 |
| Do | 0.6 | 7 | 48 | 34 | 27 | 17 | 11 | 6 |
| Do | 0.7 | 7 | 52 | 39 | 32 | 21 | 14 | 8 |
| Near Infrared | 0.7 | 7 | 43 | 31 | 23 | 15 | 10 | 5 |
| Do | 0.8 | 7 | 47 | 35 | 27 | 18 | 12 | 7 |
| Do | 1.2 | 10 | 56 | 45 | 39 | 26 | 20 | 12 |
| Do | 1.6 | 13 | 61 | 52 | 47 | 33 | 26 | 18 |
| Do | 2.0 | 17 | 65 | 57 | 53 | 39 | 32 | 23 |
| Infrared | 2.0 | 13 | 62 | 53 | 48 | 32 | 24 | 14 |
| Do | 3.0 | 26 | 70 | 62 | 59 | 44 | 37 | 27 |
| Do | 4.0 | 39 | 75 | 67 | 64 | 51 | 43 | 34 |
| Do | 5.0 | 49 | 75 | 67 | 63 | 51 | 42 | 33 |
| Do | 6.0 | 36 | 48 | 45 | 38 | 32 | 23 | 16 |
| Do | 7.0 | 2 | 2 | 2 | 3 | 1 | 1 | 1 |
| Do | 8.0 | 0 | 0 | 0 | 0 | 0 | 0 | 0 |

It is evident that bodies of all of the compositions of the present invention are superior to polycrystalline magnesium aluminate spinel bodies, prepared in the same manner, in respect to the transmittance of radiation of at least certain of the wave lengths shown. Thus, the composition containing the maximum amount of magnesia, 0.67 mol per mol of spinel, is superior to the spinel in the transmission of radiation having a wave length in the range of 1.2 to 2.0 microns. Lowering the content of excess magnesia to 0.35 mol improves the transmittance in the range of 0.4 to 5.0 microns; further reduction of magnesia content to 0.22 mol broadens this latter range to include radiation having a wave length of 6 microns. Furthermore, the body containing the smallest amount of magnesia, 0.04 mol per mol of spinel, displays marked improvement over the spinel itself in respect to the transmittance of radiation within the broad wave length range of 0.3 to 6.0 microns.

Finally, Table III clearly demonstrates that not only does the inclusion of the least amount of magnesia improve the transmittance of the body to radiation of the widest wave length range, but that the improvement at each wave length within that widest range is greatest when the least effective amount of excess magnesia is employed. Thus, for infrared radiation at 3.0 microns, the improvement, relative to the spinel body itself, of the body containing only 0.04 mol of excess magnesia, is 42% per 0.01 mol of magnesia while, on the same basis, the body containing 0.12 mol of excess magnesia represents a lesser improvement of about 12% per 0.01 mol of magnesia.

The difference between the percentage of transmittance values at 0.4 micron wavelength in the ultraviolet range and at 0.4 micron wavelength in the visible range is within experimental error and is due, in part, to the fact that different sources of radiation were employed. The values at 0.7 micron wavelength in the near infrared range were obtained using a detector of smaller area than that employed at 0.7 micron wavelength in the visible range. There is, of course, some scattering of radiation. The detector of larger area in the visible range absorbs a larger fraction of scattered radiation than does that employed in the near infrared range. Finally, the difference between values at 2.0 microns wavelength in the near infrared and infrared ranges is the result of the change of the measuring instrument.

Because of the difficulty of precisely determining analytically the relative amounts of magnesia and of magnesium aluminate spinel in the sintered products of the invention, the composition of the original mixture of magnesia and alumina source materials is relied on to define the composition of the product. Inasmuch as the amount of magnesia source material that is employed to give rise to a low level of excess magnesia in the product is quite small compared to the amount of materials employed to produce the stoichiometric spinel main component, it is evident that it becomes difficult to define with precision the composition of products of low excess magnesia content. That is, any imprecision in weighing the small amount of excess magnesia source can have a significant effect on the actual value of the excess magnesia content. Furthermore, magnesia is more volatile at elevated temperatures than either alumina or magnesium aluminate spinel. Because of this, a sintered product can contain less excess magnesia than that which is calculated from the composition of the mixture of magnesia and alumina source materials. Obviously, these sources of error can be cumulative. Accordingly, the excess magnesia content of a sintered product can be significantly less than the calculated value.

It is, therefore, within the purview of the invention to employ magnesia in any small amount in excess of the stoichiometric spinel that is effective to enhance the transmissivity to visible and infrared radiation of the sintered products of the invention. The invention teaches and specifically shows that as the content of excess magnesia of the sintered body is reduced the transmissivity of the body is increased. Furthermore, in general, the data set out above indicate that the rate of improvement increases as the magnesia content decreases. Thus, from Table I it can be determined that for the bodies fired at 1850° the improvement in transmissivity at 0.5 micron wavelength over the stoichiometric spinel bodies containing, per mol of spinel, 0.35, 0.22, 0.12 and 0.04 mol of excess MgO is 88%, 200%, 304% and 511% respectively. Were the improvement linear with decreasing magnesia content an improvement of only about 380% over the stoichiometric spinel would be expected for the body containing 0.04 mol of excess magnesia rather than the actual value of 511%. Stated in another fashion, the rate of improvement between a body containing 0.35 mol of magnesia and one containing 0.12 mol is essentially linear, being about 10% per 0.01 mol decrease in magnesia content. However, the rate of improvement between a body containing 0.12 mol of magnesia per mol of spinel and one containing 0.04 mol is 26% per 0.01 mol decrease in magnesia content. Accordingly, it is evident that the lowest level of magnesia herein employed, 0.04 mol (calculated), is not a limiting lower value. And it is reasonably expected that such bodies actually containing as little as 0.02 mol excess MgO per mol of stoichiometric spinel will exhibit substantially enhanced transmittance properties.

I claim:

1. As an article of manufacture, a polycrystalline body composed of a shaped and sintered mass of a pulverulent, intimate, uniform mixture consisting essentially of magnesium aluminate spinel and excess magnesia, said excess magnesia being present in a small but effective amount up to about 0.35 mol of said magnesia per mol of said spinel to effect in-line transmittance per one millimeter thickness of said body of not less than 9% of radiation of all wavelengths in the first wavelength range of from about 0.4 to about 0.7 micron and not less than about 32% of radiation of all wavelengths in the second wavelength range of from about 2 to about 5 microns.

2. The article of claim 1 in which the excess magnesia is present in an amount of at least about 0.02 mol per mol of magnesium aluminate spinel.

3. The article of claim 2 in which the excess magnesia is present in an amount of no more than about 0.12 mol per mol of magnesium aluminate spinel to effect in-line transmittance per one millimeter thickness of said body of: not less than about 21% of radiation of all wavelengths in said first wavelength range and not less than about 53% of radiation of all wavelengths in said second wavelength range.

4. The article of claim 2 in which the excess magnesia is present in an amount of at least about 0.04 mol per mol of magnesium aluminate spinel.

5. The article of claim 1 having an effective amount of excess magnesia to effect in-line transmittance per one millimeter thickness of said body of about: at least 13% of 0.5 micron wavelength radiation, at least 18% of 0.8 micron wavelength radiation, at least 26% of 1.2 microns wavelength radiation, at least 32% of 2.0 microns wavelength radiation, at least 44% of 3.0 microns wavelength radiation and at least 51% of 4.0 microns wavelength radiation.

6. The article of claim 1 wherein an amount of said excess magnesia is present as a discrete second phase uniformly dispersed throughout said spinel.

7. As an article of manufacture, a polycrystalline body composed of a shaped and sintered mass of a pulverulent, intimate, uniform mixture consisting essentially of magnesium aluminate spinel and excess magnesia with said excess magnesia being present in an amount of about 0.02 to 0.35 mol of said magnesia per mol of said spinel.

8. The article of claim 7 in which the excess magnesia is present in an amount of no more than about 0.12 mol per mol of said spinel.

9. The article of claim 7 in which the excess magnesia is present in an amount of at least about 0.04 mol per mol of said spinel.

10. The article of claim 9 in which the excess magnesia is present in an amount of no more than about 0.12 mol per mol of said spinel.

References Cited

UNITED STATES PATENTS

| | | | |
|---|---|---|---|
| 3,026,210 | 3/1962 | Coble | 106—62 |
| 3,083,123 | 3/1963 | Navias | 106—62 |
| 3,311,482 | 3/1967 | Klingler et al. | 106—39 |

OTHER REFERENCES

Hanna, Elastic Moduli of Polycrystalline Magnesia Alumina Spinel, J. Am. Cer. Soc., vol. 46, 1963, p. 106.

JAMES E. POER, Primary Examiner

U.S. Cl. X.R.

106—39, 65